May 14, 1929.  J. C. DEACON  1,713,117
METHOD OF SEPARATING SOLIDS FROM OIL
Filed Dec. 10, 1924
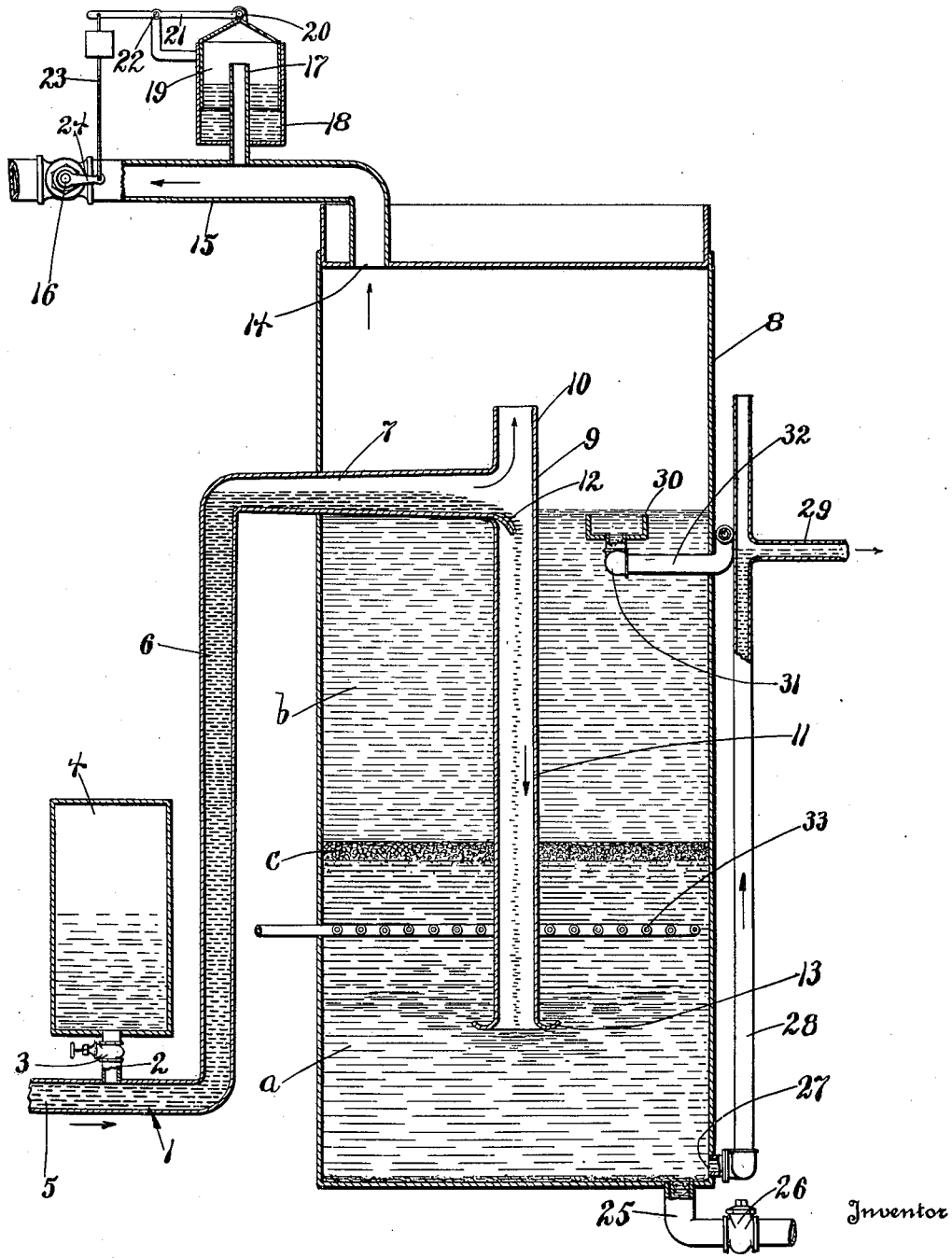
Inventor
John C. Deacon
By Lyon & Lyon
Attorneys Patented May 14, 1929.

1,713,117

UNITED STATES PATENT OFFICE.

JOHN C. DEACON, OF BAKERSFIELD, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE.

METHOD OF SEPARATING SOLIDS FROM OIL.

Application filed December 10, 1924. Serial No. 754,965.

This invention relates to a method of effecting the separation of water and solids from oil, and an object of the invention is to produce this result efficiently.

An important object of the invention is to make provision for the oil to rise through a suitable filter that will hold the foreign matter so that the oil will be cleared of such matter or at least the greater portion thereof.

Another object is to effect the filtering action by a scum formed of oil and the light foreign matter found in the crude oil.

Another object is to cause coalescence of solid particles in the oil so that they can be more readily eliminated.

Water and other foreign matter in crude petroleum is detrimental to the stock tanks, dehydraters, stills and other units of an oil refining apparatus, and this apparatus and process are for the purpose of separating oil from the water or fine foreign solid material such as sand, vegetable matter, etc., before the oil undergoes treatment in such units. The apparatus is constructed so that the paths of circulation of the various constituents of dirty crude petroleum, as it issues from the earth, are well defined in the apparatus during the settling of the water and sediment.

The mixture of emulsion, oil, water and dirt may first be brought into contact with certain chemicals to promote separation. If the foreign particles in the fluid are negatively charged, a chemical will be used which will precipitate such particles, and if the foreign particles are positively charged, the chemical employed will be of the nature that will cause deposition of the positively charged particles.

The mixture is caused to flow horizontally into a suitable settling tank through a horizontal pipe that is approximately half full. The water separates out along the bottom of the flow and the gas collects in the zone in the pipe above the liquids. The fluids are then caused to flow in a vertical column so that the water and sedimentary material will drop axially of the column and the oil flow downwardly and escape from the lower end of the column into a body of water in which the lower end of the column is emerged. The gas flows upwardly and escapes at the top of the column.

The solid matter that is carried upwardly through the body of water with the oil enters a zone at the surface of the water and constitutes a filtering medium through which the oil rises and by which said oil is filtered so as to clean it of at least some of the water and foreign matter. In the course of time the débris becomes more or less saturated with water and sinks to the bottom of the body of water whence it is drawn off by a suitable drain.

The water and oil levels are maintained at desired points by reason of the water and oil being caused to overflow at given levels, both overflows taking place through liquid seals so that the gas may be maintained under a pressure somewhat above atmospheric, there being a pressure regulating device on the gas discharge so that the gas will only discharge under a predetermined pressure.

The accompanying drawing is a more or less diagrammatic view of an apparatus capable of performing the new method.

This apparatus is constructed as follows:

The crude petroleum containing water and solids flows from the oil wells or other suitable source, not shown, through a pipe 1 and communicating with this pipe, through a suitable branch pipe 2 provided with a valve 3, is a chemical container 4 which may be charged with the chemical or chemicals that it may be desirable to employ for assisting in cleaning the oil of débris. The branch pipe 2 connects with a horizontal leg 5 of the pipe 1 and said pipe 1 also has a horizontal leg 7 which extends from the upper end of the vertical leg 6.

It may be desirable, to facilitate flow of water through the leg 7 of the pipe 1 that the bottom of the leg 7 extend aslant downwardly away from the leg 6 and this construction is shown in the drawing. The leg 7 extends substantially to the axis of a settling tank 8 and connects there with a stand pipe 9 that has a shorter portion 10 extending above the leg 7 and a longer portion 11 extending below said leg into the lower portion of the tank 8 and spaced from the bottom of said tank. Both ends of the pipe 9 are open. At the junction of the bottom portion of the leg 7 with the pipe 9 there is preferably provided a deflector 12 which extends to substantially the longitudinal axis of the pipe 9 so that water and solids flowing from the leg 7 will fall in a stream at the axis of the pipe 9. This precludes material entering the pipe 9 from clinging to the inner face of said pipe while descending therein. The lower end of the pipe 9 is provided with outwardly projecting deflectors 13 which function to prevent oil from flowing up the outer face of said pipe.

The upper portion of the tank 8 is provided with a gas port 14 which connects with a pipe 15 provided with a valve 16. The valve 16 is automatically opened and closed in accordance with the degree of pressure in the pipe 15 and the device for opening and closing the valve 16 may be of any suitable construction and, in this instance, is as follows:

Connected with the pipe 15 is a vertical tube 17 which projects into a cylinder 18 provided with a plunger 19. To the plunger 19 is pivoted at 20 one end of a lever 21 which is fulcrumed at 22. The other end of the lever 21 is connected by a link 23 with the operating arm 24 of the valve 16. Increase of pressure in the pipe 15 raises the plunger 19 and opens the valve 16 and when the pressure lowers the plunger 19 falls, thus closing the valve 16.

Communicating with the lower portion of the tank 8 is a sediment drain pipe 25 by which the débris that settles to the bottom of the tank 8 may be drawn off from the tank. The drain pipe 25 has a valve 26.

Water is drawn off from the lower portion of the tank 8 through a liquid seal and the level of discharge of the liquid seal is adjustable. The construction for the liquid seal that I at present prefer is as follows:

An outlet port 27, near the bottom of the tank 8, connects with the lower end of a swing pipe 28 which may be open at its upper end, as shown, and which is provided with a lateral branch 29. The level of the water in the tank 8 is readily regulated by changing the position of the swing pipe 28, since the outlet branch 29 of the pipe is brought to different levels by swinging the pipe 28 away from the vertical.

The oil in the tank 8 discharges at its surface into a basin 30 which connects by a double elbow swing pipe connection 31 to a liquid trap 32, the connection 31 and trap 32 together constituting a U-tube which provides a liquid seal through which the oil flows from the tank 8. Because of the double elbow swing pipe connection 31, the basin 30 may be adjusted to different levels so as to control the level of the body $b$ of oil in the tank 8.

It may be desirable, in some instances, in order to facilitate separation of the water and oil, to effect heating of the water and this may be accomplished by any suitable means and, in this instance, is effected by steam coils 33 which are positioned in the lower portion of the tank 8 at a point considerably above the bottom of said tank and also below the level at which it is desired to maintain the surface of the water body $a$. In fact, the heating coils 33 are positioned in the upper portion of the water body $a$.

The apparatus operates as follows:

The dirty oil that is to be treated, if it be desired that chemicals be added thereto, will be supplied with chemicals by opening the valve 3. If the solid particles to be precipitated are negatively charged, aluminum potassium sulphate, lime or a chemical having the same precipitating effect, will be used and if the particles are positively charged, sodium hydrate or other similarly acting chemical will be used. The mixture then passes into the settling tank through the horizontal leg 7 of the pipe 1, the deflector 12 causing the liquids and solids to drop centrally of the stand pipe 9, while the gas flows off through the upper end of said stand pipe in the upper portion of the settling tank. The liquids and solids pass from the lower end of the stand pipe 9 into the lower portion of the settling tank 8 and the lighter solid particles that rise will tend to float on the surface of the water to form with oil a scum $c$ which constitutes a filtering medium through which the oil passes upwardly into the middle portion of the settling tank. The chemical or chemicals added to the oil causes coalescence of the solid particles in the oil so that they either settle directly or are caught in the scum and may settle later. The aluminum potassium sulphate or similarly acting chemical creates a flocculent material which will either settle and clarify the water or assist in the formation of a more finely meshed filtering medium than is present in the scum $c$ when said chemical is not employed. The filtering medium cleans the oil of some water and foreign material as the oil rises through said medium.

The water rises in the swing pipe 28 until it reaches the discharge branch 29 and then flows off through said branch and thus the water is maintained at the desired level. The oil discharges into the basin 30 and thence from the tank 8 through the U-tube 31, 32, the oil also being maintained at the desired level by adjustment of the basin.

Since the water and solids are dropped axially of the pipe 9, the oil will surround the down flowing stream of water and solids and will issue from the lower end of the stand pipe and be deflected away from the sides of said stand pipe by the deflector 13, thus precluding the oil creeping up the outer face of the stand pipe. This insures that the oil will pass through the filtering medium $c$.

To facilitate separation of the oil and water, the heating coils 33 may be operated so as to heat the water. The convection currents produced in the water will not agitate the débris that has settled to the bottom of the tank 8 since such currents are considerably above the level of such débris. As the solids collect in the bottom of the tank, 8 they will be drawn off through the drain pipe 25 by opening the valve 26.

The gas under pressure in the upper portion of the tank 8 will, when a predetermined pressure is reached, cause opening of the valve 16 so as to discharge through the pipe 15. This pressure may be only an ounce or so above atmospheric to be satisfactory but in any event it will be somewhat above the pressure in the gas discharge line 15 beyond the pressure regulating device above described.

I claim:

1. The method of separating water and solids from oil contaminated with them which consists in establishing a body of water and a scum at the surface of the water, continuously discharging oil contaminated with water and solids upwardly through the water into the scum to cause the oil to pass into the zone lying above the level of the scum to filter the oil and separate the water therefrom and to continuously add solids from the contaminated oil to the scum to take the place of those solids that absorb water and sink to the bottom of the body of water, and thus maintain the scum, drawing off water from beneath the scum as it accumulates, and continuously drawing off the filtered oil from above the scum.

2. The method of separating water and solids from oil contaminated with them which consists in establishing a body of water and a scum at the surface of the water, heating the body of water, continuously discharging oil contaminated with water and solids upwardly through the water into the scum to cause the oil to pass into the zone lying above the level of the scum to filter the oil and separate the water therefrom and to continuously add solids from the contaminated oil to the scum to take the place of those solids that absorb water and sink to the bottom of the body of water, and thus maintain the scum, drawing off water from beneath the scum as it accumulates, and continuously drawing off the filtered oil from above the scum.

Signed at Los Angeles, California, this 26th day of November, 1924.

JOHN C. DEACON.